(12) United States Patent
Coffey et al.

(10) Patent No.: US 7,238,278 B2
(45) Date of Patent: *Jul. 3, 2007

(54) APPARATUS FOR PURIFYING WATER

(75) Inventors: Richard T. Coffey, Pompano Beach, FL (US); Alvin Costa, Tiverton, RI (US); Raymond Albert Hin, Lilydale (AU); Gary Andrew Kennedy, Croydon (AU); Christopher Kampf, Cranston, RI (US); Daniel Nelsen, Providence, RI (US); Michael Pereira, Smithfield, RI (US)

(73) Assignee: Zodiac Pool Care, Inc., Vista, CA (US)

( * ) Notice: Subject to any disclaimer, the term of this patent is extended or adjusted under 35 U.S.C. 154(b) by 508 days.

This patent is subject to a terminal disclaimer.

(21) Appl. No.: 10/433,172

(22) PCT Filed: Oct. 28, 2002

(86) PCT No.: PCT/US02/34491

§ 371 (c)(1),
(2), (4) Date: May 28, 2003

(87) PCT Pub. No.: WO03/040038

PCT Pub. Date: May 15, 2003

(65) Prior Publication Data

US 2004/0050781 A1   Mar. 18, 2004

Related U.S. Application Data

(63) Continuation-in-part of application No. 10/014,944, filed on Oct. 26, 2001, now Pat. No. 6,761,827.

(51) Int. Cl.
*C02F 1/467* (2006.01)

(52) U.S. Cl. .................. 210/94; 204/228.1; 204/229.6; 204/248; 205/498; 205/744; 205/753; 210/117; 210/143; 210/167.11; 210/192; 210/198.1; 210/205

(58) Field of Classification Search ................. 210/752
See application file for complete search history.

(56) References Cited

U.S. PATENT DOCUMENTS 4,263,114 A   4/1981   Shindell (Continued)

FOREIGN PATENT DOCUMENTS

AU    718005    7/2000

(Continued)

OTHER PUBLICATIONS

Patent Abstracts of Japan, vol. 2002, No. 02, Apr. 2, 2002 and JP 2001 276828 A (Miyazaki, Tomoyoshi; Miyazaki Akiko) Oct. 9, 2001 Abstract.

(Continued)

*Primary Examiner*—Peter A. Hruskoci
(74) *Attorney, Agent, or Firm*—Dean W. Russell; Kilpatrick Stockton LLP

(57) ABSTRACT

The invention relates to a method for purifying water by forming in an electrolytic cell molecular halogen, hypohalic acid, hypohalite ions or combinations thereof, from halide ions dissolved in the water; and dissolving one or more soluble metal salts in the water to provide corresponding metal ions. The invention also relates to a system for purifying water, having an electrolytic cell comprising a plurality of electrodes sufficient to electrolytically convert halide ion in the water into molecular halogen, hypohalic acid, or hypohalite ions, or combinations thereof; and a metal generator, which provides concentrations of one or more metals to the water.

22 Claims, 7 Drawing Sheets

U.S. PATENT DOCUMENTS

| | | | |
|---|---|---|---|
| 4,328,084 A | 5/1982 | Shindell | |
| 4,364,814 A | 12/1982 | Langley | |
| 4,422,219 A * | 12/1983 | Kepiro | 24/176 |
| 4,451,341 A | 5/1984 | Miller | |
| 4,680,114 A | 7/1987 | Hayes | |
| 4,701,265 A * | 10/1987 | Carlsson et al. | 210/744 |
| 4,781,805 A | 11/1988 | Dahlgren | |
| 4,936,979 A | 6/1990 | Brown | |
| 4,992,156 A | 2/1991 | Silveri | |
| 5,076,315 A | 12/1991 | King | |
| 5,328,584 A * | 7/1994 | Erickson et al. | 205/743 |
| 5,746,923 A | 5/1998 | Forward | |
| 5,772,896 A | 6/1998 | Denkewicz, Jr. et al. | |
| 5,792,369 A | 8/1998 | Johnson | |
| 5,935,609 A | 8/1999 | Denkewicz, Jr. et al. | |
| 5,993,669 A | 11/1999 | Fulmer | |
| 5,993,753 A | 11/1999 | Davidson | |
| 6,007,693 A * | 12/1999 | Silveri | 205/335 |
| 6,039,883 A | 3/2000 | Milde et al. | |
| 6,093,422 A | 7/2000 | Denkewicz, Jr. et al. | |
| 6,132,627 A | 10/2000 | Joko et al. | |
| 6,190,547 B1 | 2/2001 | King et al. | |
| 6,197,195 B1 | 3/2001 | Booth et al. | |
| 6,207,060 B1 | 3/2001 | McKay | |
| 6,210,566 B1 | 4/2001 | King | |
| 6,221,321 B1 | 4/2001 | Fleischer et al. | |
| 6,224,744 B1 | 5/2001 | Casado Gimenez et al. | |
| 6,224,779 B1 | 5/2001 | Spector | |
| 6,238,546 B1 * | 5/2001 | Knieper et al. | 205/742 |
| 6,254,788 B1 | 7/2001 | Davidson | |
| 6,254,894 B1 | 7/2001 | Denkewicz, Jr. et al. | |
| 6,287,462 B1 | 9/2001 | Likos | |
| 6,350,385 B1 * | 2/2002 | Holt et al. | 210/748 |
| 6,761,827 B2 * | 7/2004 | Coffey | 210/748 |
| 6,982,040 B2 * | 1/2006 | Costa et al. | 210/753 |
| 2002/0189954 A1 | 12/2002 | Miyazaki et al. | |

FOREIGN PATENT DOCUMENTS

| | | |
|---|---|---|
| DE | 36 29 010 A | 3/1988 |
| GB | 1 310 764 A | 3/1973 |
| GB | 2 348 945 A | 10/2000 |
| WO | WO 97/37939 | 10/1997 |
| WO | WO 99/44949 | 9/1999 |
| WO | WO 03/040038 A2 | 5/2003 |
| ZA | 97/2867 | 3/1999 |

OTHER PUBLICATIONS

International Search Report in related PCT/US02/34491.

Fifth Edition *Chemical Engineers' Handbook*, Robert H. Perry/Cecil H. Chilton (published by McGraw-Hill Book Company), Section 5 Fluid and Particle Mechanics, pp. 5-10 thru 5-15, (copyright 1973).

* cited by examiner

APPARATUS FOR PURIFYING WATER

CROSS-REFERENCE TO RELATED APPLICATIONS

This application is the U.S. national phase of International Application No. PCT/US02/34491 filed on Oct. 28, 2002, which claims priority to U.S. Ser. No. 10/014,944 filed on Oct. 26, 2001, now U.S. Pat. No. 6,761,827, the entire contents of which are incorporated herein by this reference.

FIELD OF THE INVENTION

This invention relates to the methods and apparatus for purifying and sanitizing water using a combination of electrolytic purification and introduction of microbicidal metal species into the water. More particularly, the invention relates to the systems and methods for combining electrolytic purification and the introduction of biocidal metal ions into the water.

BACKGROUND OF THE INVENTION

Electrolytic purification of water has been carried out for some time. The process involves the purification of water that is saline, i.e., that contains some concentration of halide ion. For instance, in many swimming pools in Australia, where electrolytic purification of pool water is currently more popular than in the United States, a slight salinity level is achieved by dissolution of quantities of sodium chloride into the pool water. The water, with its dissolved halide ion, is passed through an electrolytic cell. The halide ions are oxidized by electrolysis to form hypohalic acid, hypohalite ions, or both (believed to occur through the intermediate of molecular halogen), which have known utility in disinfecting water (and whose use is typically known as "chlorinating" the water). In addition, he electrolysis reaction converts water into hydrogen and oxygen; some of the oxygen is converted further into ozone, which also has a disinfecting effect on the pool water.

Electrolytic purification is desirable because it is safe, effective, and for applications such as swimming pools, hot tubs, spas, etc., it eliminates much of the need for the pool owner or operator to handle chemicals and monitor water chemistry. The salinity levels necessary to achieve effective chlorination levels are typically well below the organoleptic thresholds in humans, and the primary chemical required to be handled by the operator is a simple alkali metal halide salt. In addition, operation of the electrolytic cell is comparatively easy, and requires little attention beyond ensuring the proper current and voltage levels are set, and maintaining the correct salinity levels in the water.

One of the disadvantages associated with electrolytic purification is the cost of the electrolytic cell, as well as the cost of replacement electrodes, which can corrode, become fouled with scale and the like or otherwise become inactivated over time. These costs are primarily driven by the size of the electrodes, which are typically constructed from titanium coated with platinum or ruthenium. Electrodes having a surface area sufficient to generate adequate chlorine levels represent a significant portion of the cost of installing and maintaining an electrolytic purification system. In addition, electrolytic cell life is limited due to the current density through the cell over time.

The introduction of microbicidal metals into water to sanitize it has also been suggested for and used in various water purification applications, such as in pools and spas. In particular, various methods of introducing metal ions, such as silver ions or copper ions, into the water have been proposed. The use of these ions to purify, e.g., pool water, results in decreased need for chlorination. Highly chlorinated pool water is often uncomfortable to, and is thought to possibly have adverse effects on the health of, swimmers and bathers, decrease the useful life of swimwear, etc. One method of introducing such ions into water that has been proposed involves the use of sacrificial electrodes containing metals corresponding to the desired ions, including alloys of silver and copper, and electrolytically dissolving the metals into the water. Other methods include contacting the water with substrates that have been coated or impregnated with metal, soluble metal salts or some combination thereof. These methods can be difficult for pool owners to control, and as a result, can sometimes provide unreliable control of metal delivery, and can cause stained surfaces when too much metal has been delivered, or result in insufficient sanitation when too little metal has been delivered.

SUMMARY OF THE INVENTION

This invention results from the surprising discovery that the use of electrolytic purification of water can advantageously be combined with the introduction of microbicidal metals to provide a purification system and method that is safe, effective, and economical. The combination of microbicidal metals with electrolytic purification allows decreased levels of metal ion to be present, along with decreased chlorine levels. As a result, there is decreased likelihood of unpleasant or unhealthy side effects from either technique, such as staining of pool surfaces, chlorine damage to hair and clothing of swimmers and bathers, reduced opportunity to produce chloramines, etc. At the same time, the pool water is sanitized for a wide variety of microorganisms by the use of multiple methods. Finally, the presence of metals in the water, at least through the resulting decrease in necessary chlorine levels, can reduce the size of electrodes necessary to maintain appropriate levels of protection. This results in a substantial decrease in the cost of deploying and maintaining an electrolytic purification system.

In one embodiment, the invention relates to a method for purifying and sanitizing water by forming in an electrolytic cell molecular halogen, hypohalic acid, hypohalite ions, or combinations of these, from halide ions dissolved in the water; and dissolving one or more metals in the water.

In another embodiment, the invention relates to a system for purifying and sanitizing water, having an electrolytic cell comprising a plurality of electrodes sufficient to electrolytically convert halide ion in the water into molecular halogen, hypohalic acid, hypohalite ions, or combinations of these; and a metal generator, which provides concentrations of one or more metals to the water.

According to certain embodiments of the invention, purification of a body or stream of water is accomplished via an apparatus that includes a housing having an inlet and an outlet. Water is directed into the inlet, which is in fluid communication with a metal generating chamber, containing media that introduces metal concentrations into the water. The media may contain metallic material which dissolves or disperses into the water, or may contain soluble metal salts, or combinations thereof. At least some of the water flows through or otherwise contacts at least a portion of the media, thereby acquiring some of the metallic material, generally in the form of metal ions. The metal generating chamber is also in fluid communication with an electrolytic purification chamber, containing an electrode assembly cartridge, which includes at least one electrolytic cell. At least a portion of the water directed into the inlet and passing through the metal generating chamber also flows through the electrolytic purification chamber and contacts the electrode assembly cartridge, which thereby electrolytically converts the halide ion in the water to chlorine. The water eventually exits the housing via the housing outlet.

These and various other embodiments of the invention result in a method and system that achieve the advantages of electrolytic purification and the advantages of microbicidal metal ion purification, but vastly reduce the concomitant disadvantages of each. Further, the combination of techniques results in a significantly more economical purification process than is achievable with electrolytic purification alone.

DETAILED DESCRIPTION OF SPECIFIC EMBODIMENTS

Figure 1:
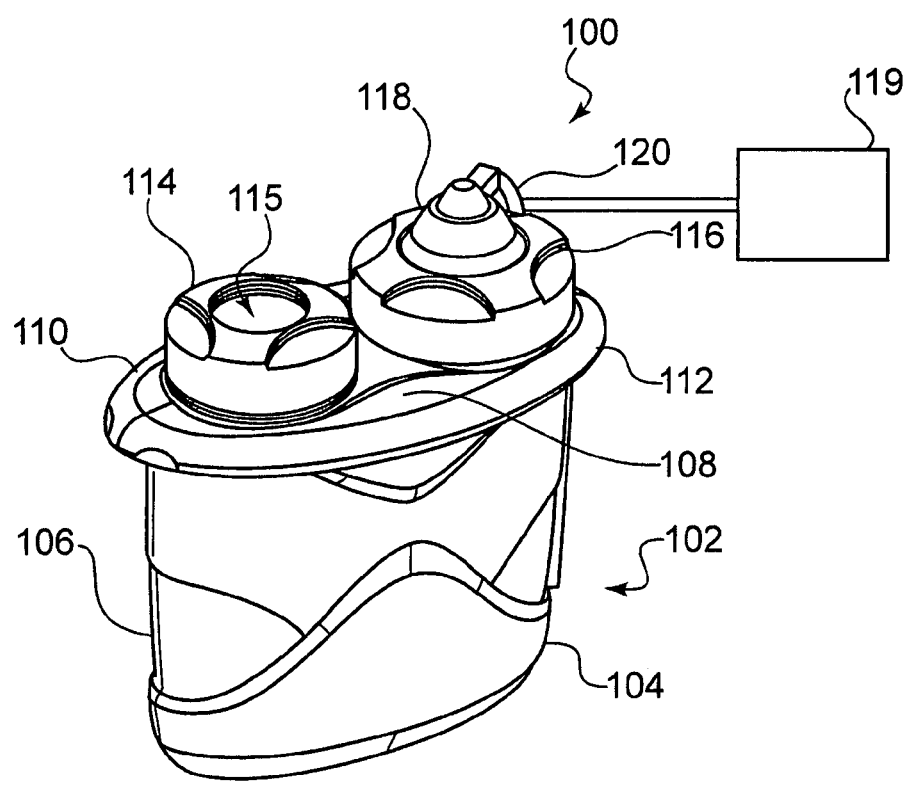
FIG. 1 is a perspective view of a water sanitization apparatus according to certain of the various embodiments of the invention.

The methods and apparatus described herein can be used to sanitize and protect water from the growth of microorganisms, such as bacteria, virii, fungi, algae, and the like. This sanitizing and protecting effect can be used for water in a variety of applications, including swimming pools, hot tubs, spas, as well as wastewater treatment facilities, cooling towers, and the like. The description below will focus on applications for swimming pools, hot tubs, spas, and the like. Those familiar with the art of water purification will be able to modify the teachings below to other water treatment applications without the exercise of undue experimentation.

In many cases, the halide ion dissolved in the water will be chloride ion, with the result that the halogen gas formed is molecular chlorine, and the hypohalic acid formed by electrolysis will be hypochlorous acid, HOCl. It will be understood, however, that other halide ions and/or acids, such as bromide, iodide, hypobromous acid, or combinations thereof, can be present in the water and oxidized by electrolysis to form similar acids and which can dissociate to the corresponding oxidized ions, which may also have a sanitizing effect.

Similarly, the metal introduced into the water will, in many cases, contain silver, copper, or some combination thereof, because of the recognized bactericidal, viricidal, and algaecidal properties of these metals. Other metals, such as zinc, can also be introduced into the water, alone or combined with the metals described above, to provide, e.g., additional biocidal activity. The metals can be introduced as metallic, zero valence material, or as metal ions that can be introduced into the water by dissolution of soluble metal salts, or by the dissolution of the metal itself. For example, silver ion can be introduced into the water through the dissolution of silver nitrate, or through the dissolution of metallic silver as the result of conversion to silver oxide and subsequent conversion of the oxide to more soluble silver species. Copper ion can be introduced into solution through the dissolution of copper sulfate or copper chloride, for example. Mixtures of different salts, or of salts with metallic material, may be combined together to provide the necessary concentration of metal ions in the water.

One particular material suitable for introducing metal ions into the water is a combination of soluble copper salt and metallic silver, deposited on a substrate, and sold under the name Nature$^2$® by Zodiac Pool Care, Inc.

The electrodes used in the electrolytic cell may be of any suitable material. However, the electrodes are generally not sacrificial electrodes made of copper, silver, zinc, or any metal species that it is desired to dissolve in the water, or any alloy thereof. One suitable electrode material is titanium, which may be coated to reduce corrosion and fouling, e.g. with a precious or semiprecious metal, such as platinum, ruthenium, or iridium.

The surface area of electrodes used in the invention can be considerably reduced as compared to the surface area of electrodes used in simple electrolytic purification (i.e., without the presence of microbicidal metal ions). The amount of this reduction typically ranges from about 25% to about 90% of the area of electrodes used in simple electrolytic purification. Assuming a halide ion concentration ranging from about 2500 ppm to about 5000 ppm, which is a typical range for salinated pool water, and a DC voltage power supply of about 5 to about 25 V, electrode surface areas generally varying between about 10 cm$^2$ to about 150 cm$^2$, will produce a chlorine concentration (calculated as $Cl_2$) of between about 0.5 ppm and about 2.0 ppm. This is sufficient to sanitize and protect a typical swimming pool provided that the concentrations of silver and copper ions in the water are maintained between about 0.010 ppm and about 0.080 ppm (silver ion) and between about 0.020 ppm and about 0.100 ppm (copper ion), respectively. The bulk concentration of silver and copper ions is not necessarily required to be constantly maintained, and is therefore substantially variable. While not wishing to be bound by any theory, it is believed that additional bactericidal and fungicidal effects are provided by ions that collect on surfaces in contact with the water, such as pool walls, filter walls, and on the interior surfaces of the housing of the invention itself. These surfaces provide large surface areas that are associated with microbicidal ions from the purification system of the invention, and it is believed that these large surface areas provide a significant contribution to the overall microbicidal effect of the invention. By contrast, in the absence of silver or copper ion, the chlorine content of the water (calculated as $Cl_2$ will generally have to be maintained at between about 2.0 ppm and about 6.0 ppm, requiring an electrode area of between about 75 cm$^2$ and about 200 cm$^2$.

The electrode voltage in the electrolytic cell typically ranges between about 5 V and about 25 V, and current flow across the electrode ranges from about 0.75 A to about 12.0 A. The source of microbicidal metal ions is generally provided in amounts capable of introducing bactericidally, viricidally, fungicidally and/or algaecidally effective amounts of metal ion into the water. Generally, these levels of metal ions range from about 0.010 ppm to about 0.500 ppm. When Nature²® is used as the source of metal ions, approximately 1.15 g to approximately 7.75 g of material per 10,000 gal. of water can be used to provide effective concentrations of silver and copper ion.

In general, sanitization of a body of water can be accomplished by removing a flow stream from the water, passing this flow stream through the electrolytic cell, and returning the treated flow stream to the body of water. Over time, and with a discrete body of water, hypohalic acid will have been carried by the pump and dispersed throughout the body of water, where it remains active in sanitizing the water. Similarly, microbicidal metal ions are typically introduced by removing a flow stream from a body of water, contacting the flow stream with a source for the microbicidal metal ions, and returning the treated flow stream through the body of water. In either case, flow rates and residence times for the removed flow streams are selected so that the water is in contact with the electrolytic cell or the source of metal ion for a sufficient time to achieve the desired results, i.e., the desired chlorine or metal ion concentrations. Alternatively, if a flow stream of water, rather than a body of water, is to be purified, the entire flow stream of water can be contacted with the electrolytic cell and the source of metal ions.

In a specific embodiment, it has been found desirable to maintain separate flow paths for water passing through the electrolytic cell and for water into which microbicidal metal ions are introduced. This limits the likelihood of any undesirable interactions between the metal ions and the electrolytic cell (such as the plating out of metal ions onto the electrodes, which may result if water containing high concentrations of metal ion pass through the electrolytic cell) as well as between the hypohalite acid(s) or hypohalite ions and the source of metal ions.

Figure 2:
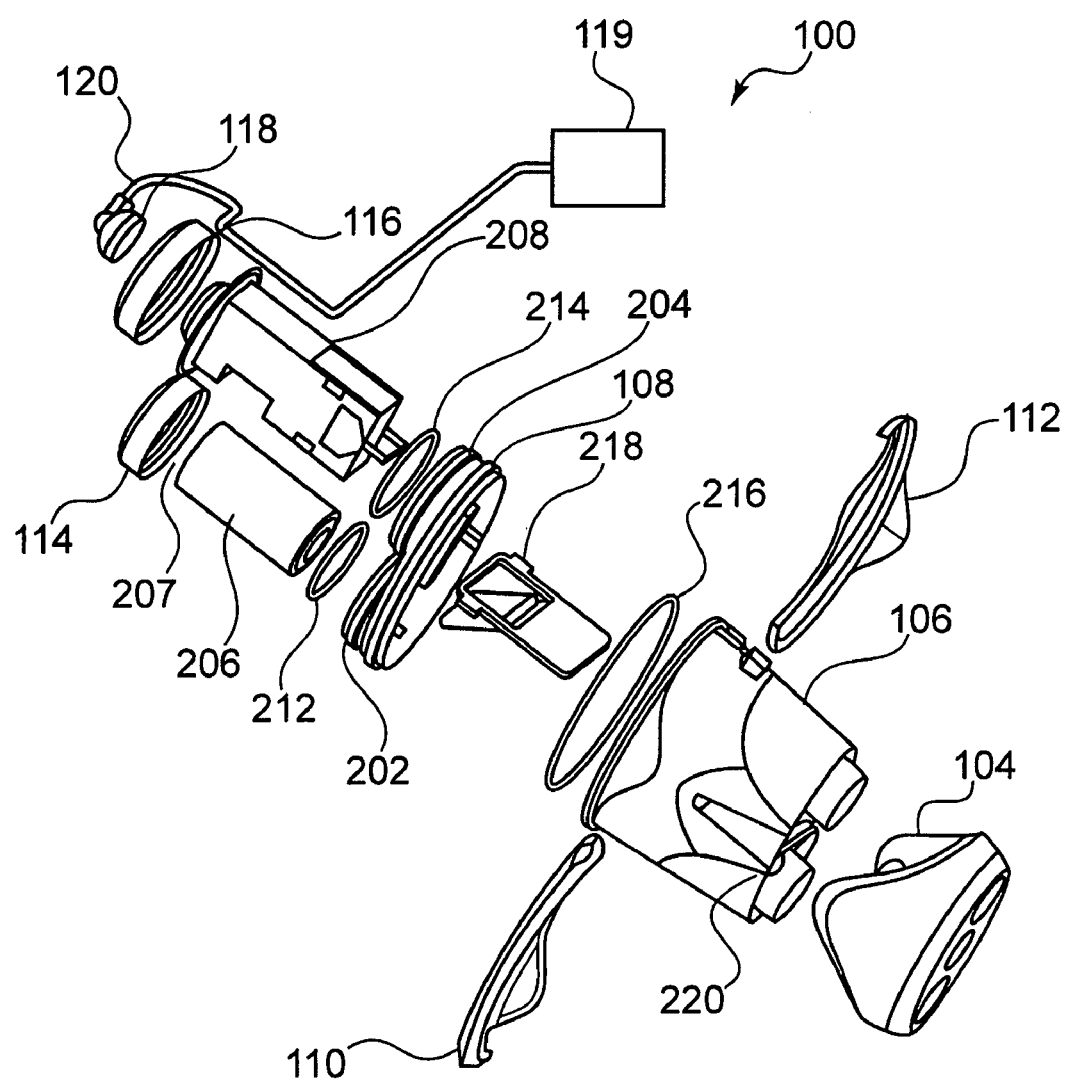
FIG. 2 is a exploded perspective view of the components of the water sanitization apparatus according to FIG. 1.

FIG. 1 is a perspective view of a water sanitization apparatus 100 according to certain of the various embodiments of the invention. In these embodiments, the water purification apparatus 100 includes a housing 102. Because chlorine will be generated within the housing by the electrolytic assembly, the housing is desirably at least primarily constructed of chlorine resistant materials. ABS (Acrylonitrile-Butadiene-Styrene) plastic resin is one such suitable material, but any appropriate chlorine resistant material can be used. The housing material preferably can be either opaque, or polished so as become transparent. The housing 102 includes an optional detachable bottom portion 104 that has apertures for an inlet and an outlet, and preferably, for a pressure relief valve, each of which are shown in FIG. 2. The housing 102 also includes a vessel bottom 106, and a vessel top 108. At least a portion of the vessel bottom 106 is transparent to provide visual verification of the flow of water through the apparatus 100. Also, the operator can visually verify that the electrolytic generating portion of the device is operating, because a byproduct of the chlorine generating reaction is the production of bubbles of hydrogen gas. By visually inspecting the operation of the apparatus 100, an operator can ensure that water is flowing through the apparatus 100, and that the water is being electrolytically sanitzed, as explained above. The components of the housing are held together at least in part by a rear clamp 110 and a front clamp 112. The clamps 110, 112 provide structural integrity and ease of assembly to the housing 102, and are preferably constructed of a strong, lightweight material such as aluminum.

FIG. 2 is a exploded perspective view of the components of the water sanitization apparatus according to FIG. 1. The vessel top 108 includes ports 202, 204 for installing and removing the metal generator 206 and an electrode assembly cartridge 208. The metal generator port 202 is preferably sealed by a removable metal generator cover 114. The metal generator 206 is capped on one end by a metal generator cap 207, which protrudes through the opening 115 in the metal generator cover 114, and may include a flange around its circumference. The electrode assembly cartridge port 208 is preferably sealed by a removable electrode assembly cartridge cover 116. The electrode assembly cartridge cover 116 includes an electrical port 210 through which an electrical connector 118 couples the electrode assembly cartridge 208 to a controller 119, via a lead 120. The electrical connector 118 is mechanically locked in place and sealed from the elements. Both the metal generator cover 114 and the electrode assembly cartridge cover 116 may optionally be tethered to the housing 102 to decrease the chance of loss while the apparatus 100 is being serviced.

To protect the components of the apparatus 100 from environmental contamination, and to prevent leakage of water, the apparatus is sealed. Either or both the metal generator port 202 and the electrode assembly cartridge port 204 includes a preferably threaded port that couples with a cover in a watertight union. The cover desirably includes a mechanical locking ring, and a jacking ring. For example, the metal generator cover 114 is rotated around the threaded end of the metal generator port until the mechanical locking ring has been overcome, at which time the metal generator cover 114 is engaged at the appropriate tightness, and cannot be tightened further. The non-rotating "jacking" ring is desirably a component of the cover 114, and is interposed between the cover 114 and an o-ring 212. One surface of the jacking ring provides a bearing surface against which the cover 114 rotates during tightening and untightening. The opposing surface of the jacking ring applies vertical pressure compressing the o-ring 212, while preventing the rotating cover 114 from mechanically stressing the o-ring 212 and from causing the metal generator cap 207 to rotate. The o-ring 212 is interposed between the jacking ring and the base of the threaded end of the metal generator port 202. Alternatively, the o-ring 212 is interposed between the jacking ring and a flange around the metal generator cap 207. Compressing the o-ring 212 creates a seal that prevents water and other materials from escaping or entering the housing 102 through the metal generator port 202. The watertight seal is achieved in the same fashion with respect to the electrode assembly port 204, the o-ring 214, and the electrode assembly cartridge cover 116.

The vessel top 108 may also utilize a mechanical locking ring, jacking ring, and/or a housing o-ring 216 to couple with the vessel bottom 106. Preferably, however, the vessel top 108 and the vessel bottom 106 are not easily disengaged after being assembled together, in order to prevent tampering or improper repair or reassembly by the user.

The water sanitization apparatus 100 preferably includes a check valve 218 and a pressure relief valve 220, the operation of which will be described in more detail below.

Figure 3:
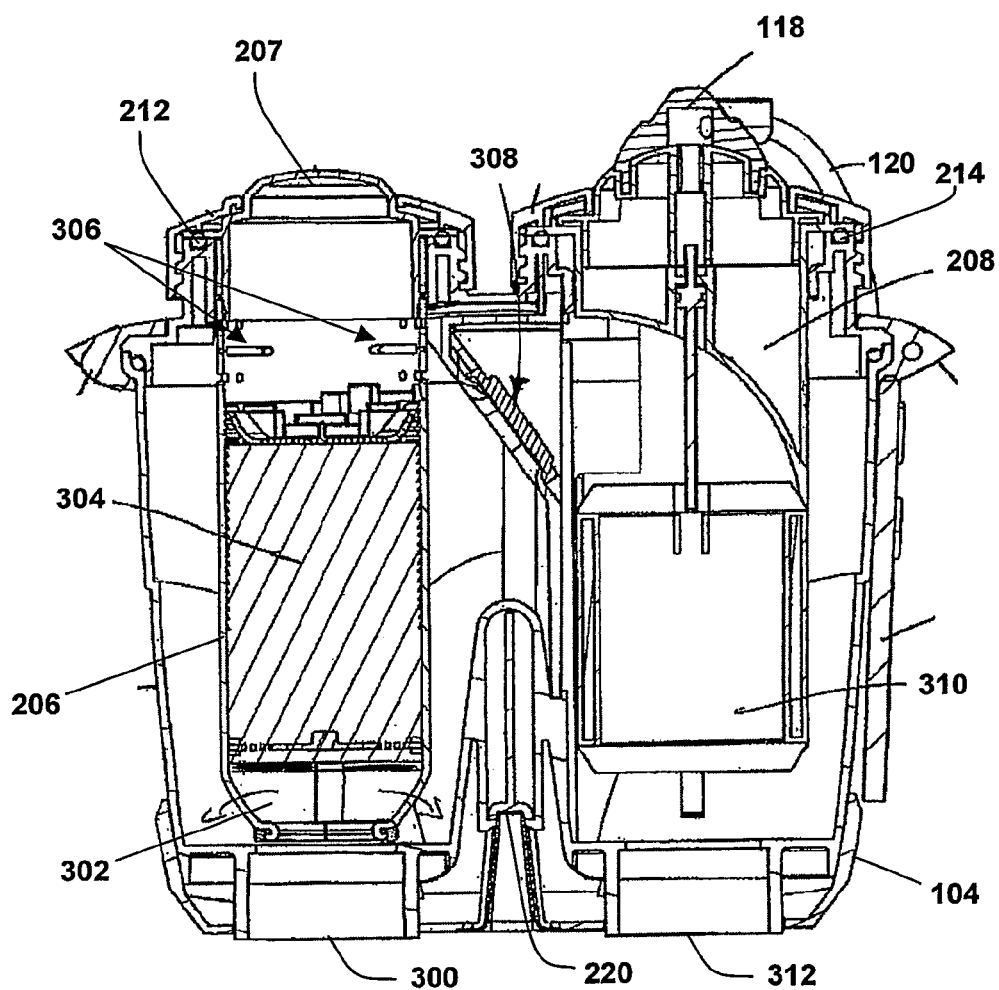
FIG. 3 is a cross-sectional view of a water sanitization apparatus according to FIG. 1.

FIG. 3 is a cross-sectional view of a water sanitization apparatus 100 according to FIG. 1. Water enters the housing 102 via the inlet 300. At least a portion of the water entering the inlet 300 is directed through media contained in the metal generator 206. The metal generator 206 is a container, desirably cylindrical, that includes at least one vent 302 and a media area 304. The bottom (inlet side) of the metal generator 206 rests on or near the vessel bottom 106. In certain embodiments of the invention, some of the water entering the metal generator 206 is expelled through the vent 302 without passing though the media area 304. The inlet pressure causes the vented water to travel around the metal generator 206, and the non-vented water to pass though the media area 304. Thus, the metal concentrations in the non-vented water are increased by contact with the media in the metal generator 206. After passing through the metal generator 206, the treated water is expelled though slots 306 at the top of the metal generator 206, and blends with the vented water that has been channeled around the metal generator 206. The pressure of the flowing water opens check valve 308, allowing the blended water to enter the electrolytic chamber and to contact electrode assembly cartridge 208.

In addition to allowing and controlling water flow between the metal generating chamber and the electrolytic purification chamber, the check valve 308 also functions as a safety feature to prevent destruction or damage to the apparatus 100 that would result were the apparatus 100 installed backwards, i.e., with the inlet and the outlet reversed. If the apparatus 100 is incorrectly installed, the check valve 308 includes a flapper assembly that will not open, thereby preventing water that has been passed though the electrode assembly cartridge 208 from entering the metal generator 206. Thus, the check valve 308 allows the flow of water from the metal generator 206 to the electrode assembly cartridge 208, and prevents flow of water from the electrode assembly cartridge 208 to the metal generator 206. Furthermore, at least a portion of the water flow will be directed through pressure relief valve 220 and expelled from the housing in a manner that is visible to the operator, to signal the operator that the device should be reinstalled properly.

Figure 4:
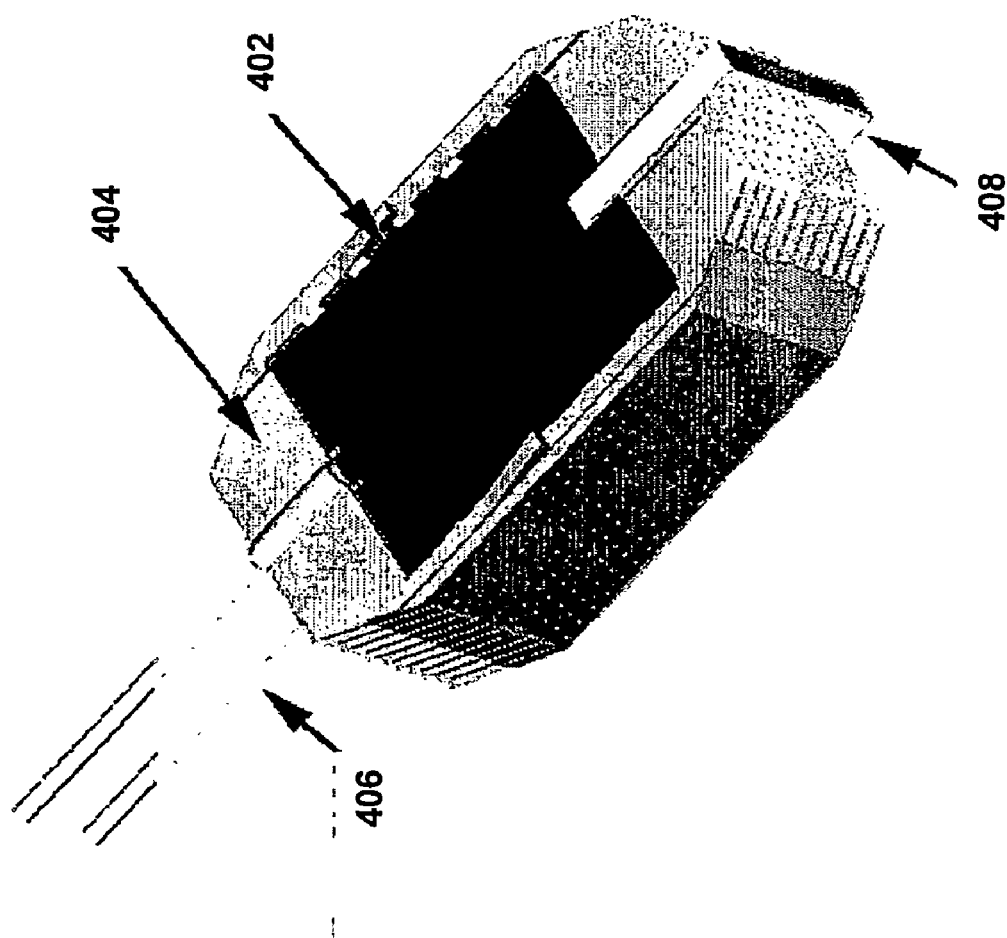
FIG. 4 is a perspective view of an electrode assembly according to certain of the various embodiments of the invention.

The electrode assembly cartridge 208 contains an electrode assembly 310, and is preferably a "full flow cell" in that all of the water entering the housing 102 can pass through the electrode assembly 310. FIG. 4 is a perspective view of an electrode assembly 310 according to certain of the various embodiments of the invention. The electrode assembly 310 includes a series of stacked and nested electrode plates 402, desirably made of coated titanium, with alternating spacers 404. Each spacer 404 is constructed of an insulating material, such as plastic, and desirably includes an insulating fin extending away from each of the edges of the plate 402 generally in the plane of the plate. The insulating fins help to increase electrolytic efficiency by helping to force electrons to pass between electrodes, rather than traveling around the electrodes. A set of leads 406 is electrically connected to the upper portion of the top and the bottom electrode plates 402. Another lead 408 is electrically connected to the lower portion of the top and the bottom electrode plates 402. Alternatively, a single lead may be electrically connected across the top electrode plate 402, wrapping around the bottom of the electrode assembly 310, with an additional electrical connection across the bottom electrode plate 402.

Figure 5:
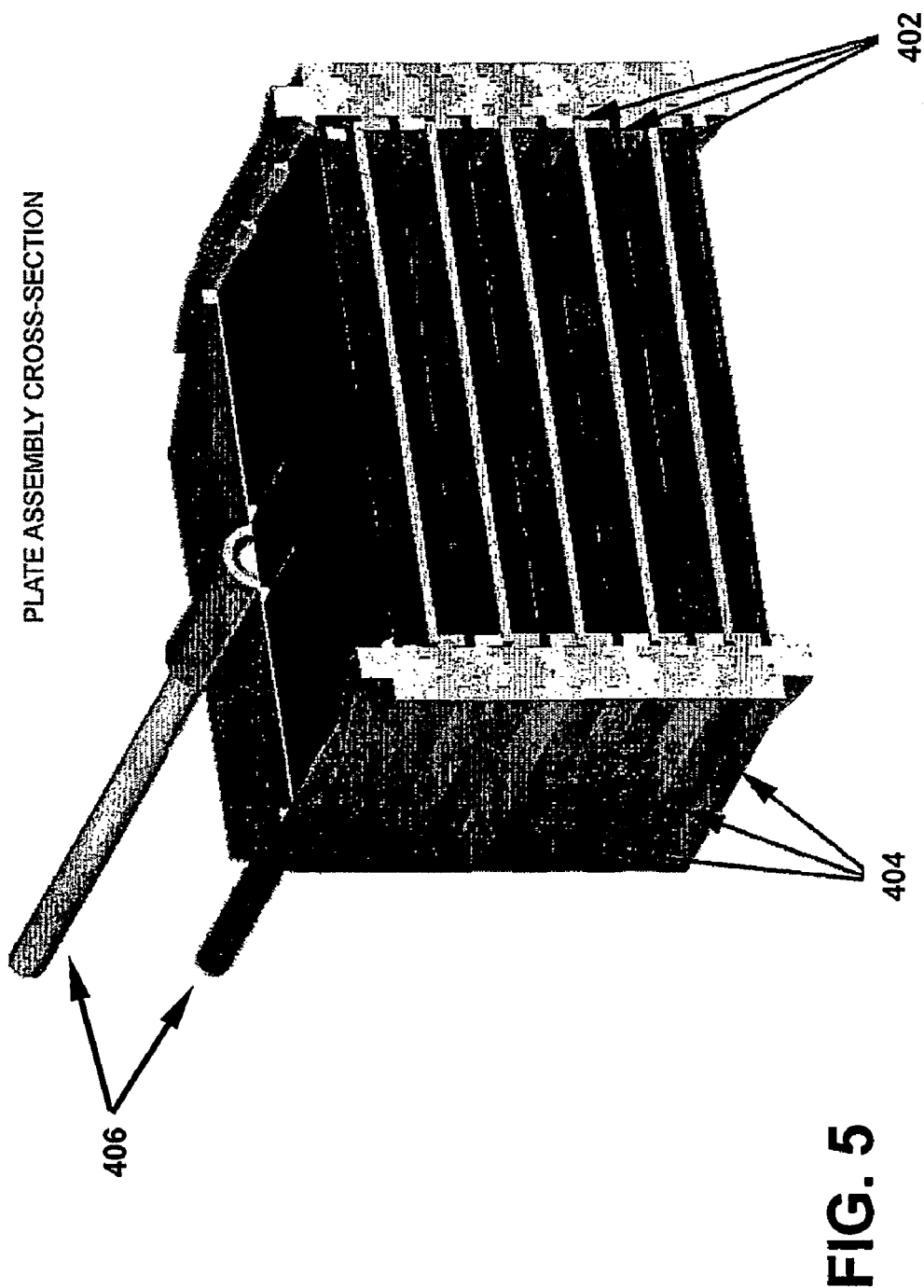
FIG. 5 is a cross-sectional view of an electrode assembly according to FIG. 4.

FIG. 5 is a cross-sectional view of an electrode assembly according to FIG. 4. The spacers 404 are interspersed between the electrode plates 402 to create spaces that allow water to flow between the plates. The spacers 404 separate adjacent electrode plates 402 preferably by a distance of about 10–12 mm. The top and bottom edges of each spacer 404 are each no wider than the electrode plate 402. Each side edge of each spacer can be wider that the electrode plate 402, such that stacking spacers 404 creates a gap between adjacent electrode plates 402. Each spacer 404 can be beveled at least on the edge positioned at the top end of the electrode assembly, thereby encouraging the flow of water between the electrode plates 402. Water flow between the plates may be laminar or slightly turbulent, provided that the flow is sufficiently rapid that chlorine produced at the electrode surfaces is rapidly cleared. Highly turbulent flow is generally avoided, as it is more likely to induce cavitation, which can bring damaging oxygen into contact with the surfaces of the electrode plates 402.

Electrons desirably pass from one electrode plate 402 to the next adjacent plate. It is desirable to at least minimize "electron jumping," i.e., the passage of electrons from one electrode plate 402 to any nonadjacent electrode plate 402. Thus, the spacers desirably form "surrounds" that insulate the sides and edges of the electrodes, each surround extending away from the edges of the electrode plate 402 in a fin-like configuration. Covering the sides and the edges of each electrode 402 can also provide protection from corrosion. In certain embodiments of the invention, the surrounds are prefabricated and subsequently assembled with the electrode plates 402. In certain other embodiments of the invention, the edges of each electrode plate 402 are overmolded with an insulating material before the electrode plates 402 are assembled into the electrode assembly 310. Thus, the surrounds may be integral to the spacers, or may be separate components.

Figure 6:
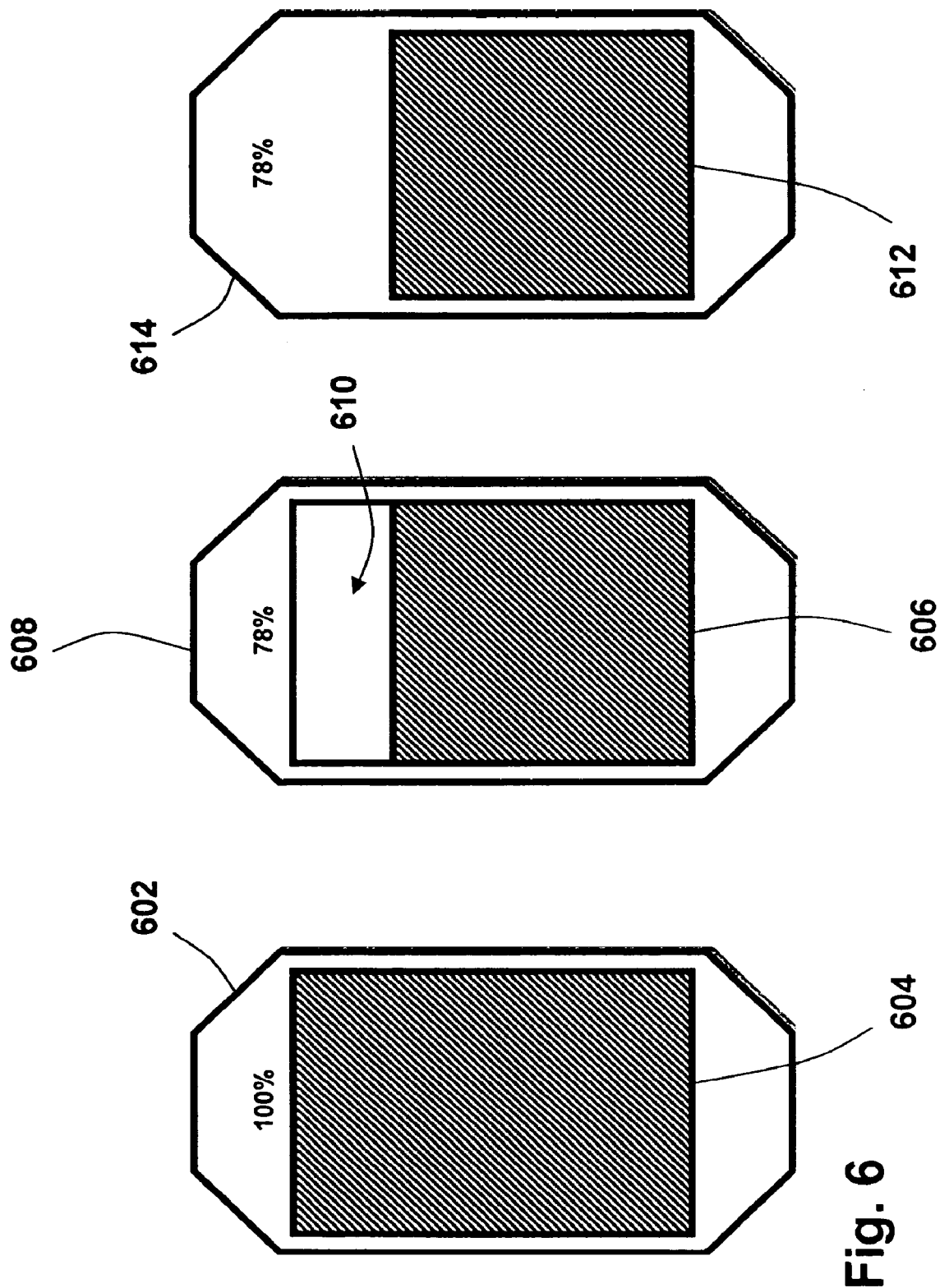
FIG. 6 is a plan view of differently sized electrode plates corresponding to varying water treatment capacities according to certain of the various embodiments of the invention.

The electrode assembly preferably contains a plurality of electrode plates 402, sufficient for treating the quantities of water to be purified. Rather than increasing the number of electrode plates 402 to treat different quantities of water, the water treatment capacity of the apparatus 100 can be controlled by varying the surface area of each electrode plate 402, preferably without varying the size of the electrode assembly cartridge 208 or the housing 102. As shown in FIG. 6, the electrode plate size is varied, while the peripheral dimensions of the spacers 404 can remain constant. For example, in the embodiments shown, spacer 602 insulates electrode plate 604. Electrode plate 604 is sized to treat the maximum amount of water for which the electrode assembly cartridge is rated. In contrast, electrode plate 606 is sized to treat 78% of the maximum rating of the electrode assembly cartridge. Thus, if electrode plate 604 is sized for an electrode assembly with the capacity to treat a 45,000 gallon pool, then electrode plate 606 is sized for an electrode assembly with the capacity to treat a 35,000 gallon pool. A "blank" or adapter 610 is used to insulate and stabilize electrode plate 606 within spacer 608, which has the same dimensions as spacer 602. Alternatively, electrode plate 612 is insulated and stabilized within spacer 614, which has the same peripheral dimensions as spacers 602 and 608, but includes additional insulating material to compensate with the smaller dimensions as compared to electrode plate 604.

Using the same number of plates 402 regardless of the volume of water to be treated has several advantages. In particular, varying only the plate size allows the standardization of various other components in the device, thereby decreasing inventory costs incurred from maintaining a supply of various sized transformers and housings 102. In addition, because the material used to make the plates is expensive, using only as much material as is necessary for a particular size pool provides cost savings as well.

As mentioned above, a byproduct of the chlorine generating reaction in the electrode assembly cartridge 208 is the production of hydrogen and other gases, such as oxygen, ozone, and chlorine. If the flow of water in the apparatus 100 decreases or ceases due to a blockage or pump failure, gas produced in the electrode assembly cartridge 208 is not continually flushed out of the apparatus 100. To protect against a dangerous buildup of hydrogen and/or other gases, or to provide for relief of excess water pressure from other sources such as pump pressure spikes, the housing 102 advantageously allows safe dissipation of excess pressure via the pressure relief valve 220. The pressure relief valve 220 can be mechanical and/or electrical, and desirably operates when an internal pressure within the apparatus exceeds a preset value ("trigger pressure"). Operation of the pressure relief valve 200 can be triggered mechanically or electronically, such as by a spring or a pressure sensitive switch. The pressure relief valve 220 is preferably set to activate, i.e., to open, at the trigger pressure, within an acceptable tolerance (e.g., 50+/−10 psi).

After passing through the electrode assembly 310, the now sanitized water exits the housing via the outlet 312.

Various embodiments of the invention include an electronic controller 119 that controls the operation of the water sanitization apparatus 100. The controller 119 preferably includes a constant voltage, constant current density power supply that drives a variable output current in the electrode assembly cartridge 208. However, in other embodiments of the invention, the controller 119 may use a constant current, variable voltage power supply. The controller 119 may include an internal rechargeable battery to keep control circuits energized in the event of a power failure. The controller 119 can include a cartridge life indicator timing circuit that indicates the end of the useful life of certain components of the apparatus 100, particularly, the media of the metal generator 206 and the electrode assembly cartridge 208. The controller 119 may also include at least one additional timing circuit to control various functions of the controller. Preferably, the controller 119 includes a non-volatile memory that retains previously established control settings.

The output current of the controller can be visually apparent to an operator through the implementation of a series of LEDs or other indicators on the controller. In one embodiment, six LEDs indicate the output current setting. For example, during a period in which the apparatus is inoperative, only one LED may be on, thereby indicating that the apparatus 100 is receiving power, but that the output current setting is zero. As another example, if the output current falls below 80% of the output current setting established by the controller, a "low salt" condition is indicated. Preferably, an LED or certain configuration of LEDs lights to visually communicate the "low salt" condition to the operator.

One of the functions of the controller is to monitor and ensure the safe operation of the apparatus 100. More specifically, the controller continually monitors the flow of water in the apparatus 100. The controller checks for continuity between electrical contacts positioned inside the apparatus 100, preferably inside the electrode assembly cartridge 208. If water is flowing through the apparatus 100, the controller will sense continuity. If the water in the apparatus 100 has been displaced, such as by a buildup of hydrogen gas, the controller will not sense continuity. The controller disrupts the supply of power to the electrode assembly cartridge 208 if the controller detects that there is a lack of continuity between the electrical contacts. Preferably, a specific LED or a certain configuration of LEDs will light to visually communicate a "no flow" condition.

In certain embodiments of the invention, the metal generating and electrolytic portions of the device are disposed above the inlet and outlet ports, forming an inverted U. The U-shaped (∩) physical configuration of the apparatus 100 has the advantage of forming a "gas trap." In these embodiments, the apparatus 100 is plumbed atop two vertical pipes, a first pipe being threaded or glued into the inlet 300 and a second pipe being threaded or glued into the outlet 312. Water flows up the first pipe and into the apparatus 100, and treated water flows out of the apparatus 100 and down the second pipe. If in-line configuration is used, and the water flow decreases or ceases, any gas buildup may tend to travel along the second pipe and into a downstream filter, eventually displacing the much larger volume of water in the filter (which can be the size of a barrel), and creating an explosion hazard. By contrast, the inverted U configuration prevents the displacement of such a large volume of water because excess gas will tend to accumulate at the top of the inverted U, thereby only displacing water in the apparatus 100. Once the accumulated gas displaces enough water to cause a loss of continuity within the apparatus 100, the apparatus 100 will be powered down by operation of the continuity check performed by the controller. If the continuity check fails to detect the loss of continuity, the displacement of water in the inverted U can only proceed until no water contacts the electrode assembly 310. If no water contacts the electrode assembly 310, current cannot flow between the electrodes in the electrode assembly 310. Thus, the electrolytic process ceases, and gas can no longer be produced.

During regular operation, deposits of minerals such as calcium carbonate or other insoluble salts can accumulate on the electrode plates 402 as a result of electrochemical reactions with dissolved salts in the water. The resulting buildup of scale can decrease the efficiency of the electrode assembly 310 and require its eventual replacement. Preferably, the controller and the electrode plates 402 are designed to enable self-cleaning of the electrode assembly 310 by periodically reversing the polarity of the potential difference (and thus, the output current) across the electrode assembly 310. The periodic reversal of polarity reduces the frequency with which the electrolytic assembly must be cleaned. In fact, without periodic reversal, an operator would likely need to remove scale from the electrode plates 402 approximately once weekly, typically by soaking the plates in an acid. The controller is programmed to continually implement a polarity reversal cycle. For example, in one embodiment, the reversal cycle consists of 5.8 hours running time, followed by a shutdown (relaxation) period of 5.5 minutes, followed by 5.8 hours running time at reversed polarity. The relaxation period is believed to allow the surface of each electrode plate 402 to depolarize. The electrode plates 402 is coated on both sides to make the plate suitable for use as either a cathode or an anode as necessary during periodic reversal of polarity. Preferably, a specific LED or a certain configuration of LEDs will light to visually communicate the polarity condition.

Another function of the controller is its ability to cause the water sanitization apparatus 100 to at least temporarily "super-chlorinate" water, particularly in response to heavy use by bathers, etc. During a super-chlorinate cycle, the controller raises the nominal output current in the electrode assembly 310 by approximately 15% for a predefined period of time, at the end of which, the controller lowers the nominal output current to routine levels. Preferably, a specific LED or a certain configuration of LEDs will light to visually communicate a "super-chlorinate" condition to the operator.

The controller also includes various switches that enable the activation and deactivation of the various functions of the controller. In particular, the controller preferably includes a switch to adjust chlorine output, a switch to activate the super-chlorinate cycle, a switch to reset cartridge life indicator, a power on/off switch, and various switches for testing the controller. The test switches are preferably hidden from the user, so as to be accessible by professional installers or servicers. In certain embodiments, all indicating LEDs and control switches are fitted to a single printed circuit board assembly. In an example of one LED configuration: LED 1 indicates a "low salt" condition; LED 2 indicates a "no flow" condition; LED 3 indicates a "super-chlorinate" condition; LED 4 indicates that the metal generator must be replaced soon; LED 5 indicates that the metal generator must be replaced immediately; LED 6 indicates that the electrode assembly cartridge must be replaced soon; LED 7 indicates that the electrode assembly cartridge must be replaced immediately; and LEDs 8–13 indicate the output current setting of the controller.

The controller 119 may have several predetermined output current settings that define the possible output currents in the electrode assembly 310. In each embodiment, the controller 119 seeks to maintain a given current density on each plate 402 to compensate for conductivity swings due to variations in the level of salinity. Without this compensation, an oversalinated pool would cause overcurrent conditions within the apparatus 100, potentially burning out components of the electrode assembly cartridge. In one embodiment, there are four possible output current levels that can be selected by fitting an internal shunt in the controller 119. The current and voltage levels can vary according to the particular application. In this example, the four possible output currents C1 through C4 are generated at a constant voltage of preferably 22 volts (DC), and can be expressed as follows:

C1=1.5 amps DC (super-chlorinate 1.725 amps DC);

C2=2.5 amps DC (super-chlorinate 2.875 amps DC);

C3=3.5 amps DC (super-chlorinate 4.025 amps DC); and

C4=4.5 amps DC (super-chlorinate 5.175 amps DC).

The various current settings are preferably preset, and are retrieved from the memory of the controller 119 to enable the operator to select from two or more allowable current settings.

Certain embodiments of the invention possess additional features. The housing can be designed to be completely watertight, preferably withstanding pressures of 100 psi or higher, and more particularly, 2 bars (29 psi). However, elements of the metal generator and the electrode assembly are easily accessed and replaced by a user or other operator. An optical reminder system alerts the operator to the need to replace elements, preferably before the effectiveness of the elements has been exhausted. Visual and/or electronic indicators can be implemented to relay the status of the apparatus to an operator.

An advantage of the various embodiments of the water sanitation apparatus 100 is its ease of installation and maintenance. The housing 102 is compact, allowing for installation in space restricted areas. The installer couples the apparatus 100 with the source of the water to be treated by connecting a suitable water carrying conduit, such as a 2" PVC (polyvinyl chloride) pipe, to the inlet 300. The inlet conduit is further connected to the source of the water to be sanitized. The installer then connects a second conduit to the outlet 312, for allowing egress of sanitized water.

The operator can also easily install or replace metal generator 206 or electrode assembly cartridge 208. To do so, the operator simply loosens the appropriate metal generator cover 114 or electrode assembly cover 116 and disengages the corresponding cartridge. A new cartridge is engaged, and the cover is retightened. As mentioned above, the controller LEDs alert the operator to the need to replace cartridges. In one embodiment, replacement of the metal generator 206 is indicated every six months, and replacement of the electrode assembly cartridge is indicated every three years.

Certain embodiments of the water sanitation apparatus 100 utilize visual coding to assist in ensuring that the proper interchangeable components are utilized for a given application. For instance, the color and/or shape of the metal generator cover 114 and/or the metal generator cap 207 may indicate the capacity of the metal generator 206. The color and/or shape of the electrode assembly cartridge cover 116 may similarly indicate the size of the electrode plates 402 within. The color of the housing 102 may indicate the maximum volume of water that can be treated by any combination of components with the apparatus 100.

Figure 7:
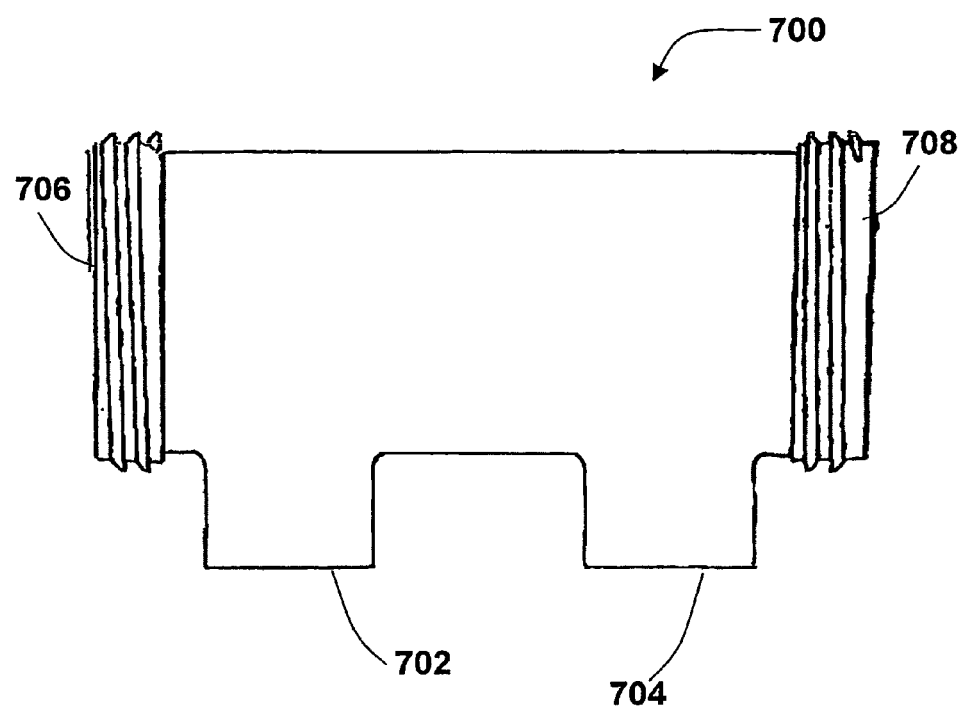
FIG. 7 is a side view of a water sanitization apparatus according to another of the various embodiments of the invention.

FIG. 7 is a side view of an alternative embodiment of a water sanitization apparatus 100. In this embodiment, the metal generator 206 and the electrode assembly cartridge 208 are disposed in series along the length of the housing 700. The metal generator 206 and the electrode assembly cartridge 208 are separated by a check valve which prevents backflow from the electrode assembly cartridge to the metal generator 206. Water enters the inlet 702 and exits through the outlet 704. The metal generator (not shown) can be accessed via a metal generator cover (not shown) that fits on the threaded end 706 of the housing 700. The electrode assembly cartridge 208 can be accessed via an electrode assembly cartridge cover (not shown) that fits on the threaded end 708 of the housing 700. The housing is preferably transparent to enable visual inspection of the operation of the apparatus 100. This embodiment preferably also includes safety features such as a pressure relief valve, and a continuity sensor.

The foregoing description of various aspects, features, and embodiments of the invention has been presented only for the purpose of illustration and description and is not intended to be exhaustive or to limit the invention to the precise forms disclosed. Many modifications and variations are possible in light of the above teaching. For example, it should be understood that although the present invention has been described primarily with water flowing through the metal generator and then through the electrolytic chamber, the principles of the invention can be implemented conversely. The materials used for each element of the water sanitization apparatus are limited only by the mechanical, electrical, and chemical properties of the materials. Several shapes, sizes and configurations are disclosed, although many other shapes, sizes, and configurations are possible without departing from the scope and spirit of the invention.

What is claimed is:

1. An apparatus for purifying water, comprising:
   an inlet, for receiving the water;
   a metal generating chamber in fluid communication with to inlet, the metal generating chamber comprising media that introduces metal into the water;
   an electrolytic purification chamber in fluid communication with the metal generating chamber, comprising an electrode assembly cartridge having at least two electrodes; and
   an outlet in fluid communication with the electrolytic purification chamber.

2. The apparatus of claim 1, further comprising a housing that encloses the metal generating chamber and the electrolytic purification chamber, and configured to:
   direct at least a portion of the water through the metal generating chamber;
   direct the water through the electrolytic chamber; and
   direct the water out of the housing via the outlet.

3. The apparatus of claim 2, further comprising a pressure relief valve in fluid communication with the interior of the housing.

4. The apparatus of claim 2, wherein the housing is formed from a chlorine-resistant material.

5. The apparatus of claim 2, wherein the housing is at least partially transparent.

6. The apparatus of claim 5, wherein the transparent portion of the housing allows visual confirmation of water flow and operation of the electrode assembly cartridge.

7. The apparatus of claim 1, further comprising a check valve disposed between the metal generating chanter and the electrolytic purification chamber, and adapted to allow flow of water from the metal generating chamber to the electrolytic purification chamber, but to prevent flow of water from the electrolytic purification chamber to the metal generating chamber.

8. The apparatus of claim 1, wherein the electrode assembly cartridge comprises a plurality of metal plates which function as electrodes, and wherein each pair of plates is associated with an insulating spacer adapted to maintain an appropriate gap between the pair of plates.

9. The apparatus of claim 1, wherein the electrode assembly cartridge further comprises at least one insulating surround disposed around the edge of each metal plate, thereby reducing contact between the metal plate edges and water.

10. The apparatus of claim 9, wherein at least one surround further comprises an insulating fin extending from the surround in one or more directions.

11. The apparatus of claim 1, wherein the metal generating chamber and the electrolytic purification chamber are vertically oriented and disposed above the inlet and outlet, respectively.

12. The apparatus of claim 1, further comprising a controller that is coupled to the electrode assembly cartridge and that controls the operation of the apparatus.

13. The apparatus of claim 12, wherein the controller comprises a power supply electrically connected to the electrode assembly cartridge, and capable of inducing a current to flow across the electrodes.

14. The apparatus of claim 13, wherein the controller is adapted to reverse the polarity of the potential difference across the electrode assembly.

15. The apparatus of claim 14, wherein the controller comprises control electronics adapted to cause the power supply to reverse polarity periodically and automatically.

16. The apparatus of claim 13, wherein the controller comprises control electronics adapted to maintain a substantially constant current density to the electrode assembly cartridge.

17. The apparatus of claim 13, wherein the controller comprises control electronics adapted to temporarily increase current density to the electrode assembly cartridge.

18. The apparatus of claim 13, wherein the controller comprises control electronics and memory circuits adapted to store information about the most recent settings of the control electronics.

19. The apparatus of claim 18, wherein the control electronics further comprise circuits adapted to retrieve information from the memory circuits and change the current settings to the retrieved settings.

20. The apparatus of claim 12, wherein the electrode assembly cartridge comprises a continuity sensor disposed within the housing, and adapted to allow the controller to sense when the volume of the water in the housing drops below a preset level.

21. The apparatus of claim 20, wherein the continuity sensor is electrically connected to a shut-off circuit adapted to discontinue power to the electrode assembly cartridge when the water volume in the housing drops below the preset level.

22. An apparatus for purifying water, comprising:
a housing having an inlet and an outlet for water to enter and leave;
a metal generating chamber within the housing, in fluid communication with the inlet or outlet and comprising media for introducing metal into the water;
an electrolytic purification chamber in fluid communication with the inlet or outlet, and in fluid communication with the metal generating chamber, comprising a plurality of electrodes capable of generating halogen from dissolved halide ion;
wherein when the metal generating chamber is in fluid communication with the inlet, the electrolytic purification chamber in fluid communication with the outlet, and conversely.

* * * * *